United States Patent
Kobayashi et al.

(10) Patent No.: US 8,809,469 B2
(45) Date of Patent: Aug. 19, 2014

(54) CURABLE ORGANOPOLYSILOXANE COMPOSITION, OPTICAL DEVICE SEALING MATERIAL, AND OPTICAL DEVICE

(71) Applicant: Shin-Etsu Chemical Co., Ltd., Tokyo (JP)

(72) Inventors: Ataru Kobayashi, Annaka (JP); Toshiyuki Ozai, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/745,267

(22) Filed: Jan. 18, 2013

(65) Prior Publication Data

US 2013/0197139 A1    Aug. 1, 2013

(30) Foreign Application Priority Data

Jan. 31, 2012  (JP) ................... 2012-018731

(51) Int. Cl.
*C08L 83/04*    (2006.01)
(52) U.S. Cl.
USPC ............. 525/477; 525/478; 524/267; 528/15; 528/31; 528/32; 257/791
(58) Field of Classification Search
None
See application file for complete search history.

(56) References Cited

U.S. PATENT DOCUMENTS

| | | |
|---|---|---|
| 2004/0116640 A1 | 6/2004 | Miyoshi |
| 2006/0073347 A1 | 4/2006 | Morita et al. |
| 2006/0081864 A1 | 4/2006 | Nakazawa |
| 2007/0073026 A1 | 3/2007 | Miyoshi |
| 2007/0112147 A1 | 5/2007 | Morita et al. |
| 2008/0090986 A1* | 4/2008 | Khanarian et al. ............. 528/15 |
| 2010/0145000 A1 | 6/2010 | Kimura |

FOREIGN PATENT DOCUMENTS

| | | |
|---|---|---|
| JP | A 2004-143361 | 5/2004 |
| JP | A 2004-186168 | 7/2004 |
| JP | A 2004-292807 | 10/2004 |
| JP | A 2004-359756 | 12/2004 |
| JP | A 2005-105217 | 4/2005 |
| JP | A-2006-299099 | 11/2006 |
| JP | A 2007-084766 | 4/2007 |
| JP | A 2010-132795 | 6/2010 |
| WO | WO 2008/023537 | * 2/2008 |

OTHER PUBLICATIONS

Apr. 15, 2014 Notification of Reasons for Refusal issued in Japanese Application No. 2012-018731 with partial English-language translation.

* cited by examiner

*Primary Examiner* — Marc Zimmer
(74) *Attorney, Agent, or Firm* — Oliff PLC

(57) ABSTRACT

The present invention is a curable organopolysiloxane composition containing (A) a compound shown by the following average composition formula (1), wherein $R^1$ represents an aliphatic unsaturated group, $R^2$ represents a monovalent hydrocarbon group, $R^3$ represents an aliphatic hydrocarbon group, Ar represents an aryl group, and "n" and "m" represent positive numbers which satisfy $n \geq 1$, $m \geq 1$, and $n+m \geq 10$, (B) a hydrogen atom-containing organic silicon compound having at least two silicon atom-bonded hydrogen atoms per one molecule while not having an aliphatic unsaturated group, and (C) a hydrosilylation catalyst which contains a platinum group metal. Thereby, there can be provided a curable organopolysiloxane composition which can give a cured product having high transparency, high refractive index, and excellent thermal shock resistance; an optical device sealing material; and an optical device.

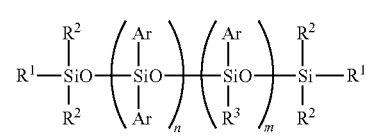

(1)

11 Claims, No Drawings

CURABLE ORGANOPOLYSILOXANE COMPOSITION, OPTICAL DEVICE SEALING MATERIAL, AND OPTICAL DEVICE

BACKGROUND OF THE INVENTION

1. Field of the Invention

The present invention relates to a curable organopolysiloxane composition, an optical device sealing material comprised of the composition, and an optical device which is sealed by the cured said composition.

2. Description of the Related Art

An addition-curable type organopolysiloxane composition contains an organopolysiloxane which contains an aliphatic unsaturated group such as an alkenyl group and an organohydrogen polysiloxane; and thus, it gives a cured product by curing with a hydrosilylation reaction. A cured product obtained as mentioned above not only has excellent heat resistance, cold resistance, and electrical insulation properties but also is transparent; and thus, it is used in many optical uses such as an LED sealing material.

In a polysiloxane used in an optical field, high transparency and high refractive index are required so that, to meet these requirements, a method in which dimethylsiloxane-diphenylsiloxane copolymer or polymethyl phenylsiloxane is used for main skeleton is generally used. However, it is difficult to obtain a cured product having refractive index of 1.54 or higher when these linear polysiloxanes are used. On the other hand, a cured product of a polysiloxane which is made branched and introduced with phenyl groups can give refractive index of about 1.53 to 1.54; but the cured product obtained thereof is not elastic but hard resin-like.

Accordingly, an example is reported to use a homopolymer of diphenyl siloxane in its main skeleton as a linear polysiloxane which gives a cured product having refractive index of 1.54 or higher. However, it is difficult to synthesize a homopolymer of diphenyl siloxane having a long chain, so that many cured products using these polysiloxanes are synthesized from a relatively short chain material.

Meanwhile, there may be mentioned a resistance to a thermal impact, i.e., a thermal shock resistance, as one necessary reliability in an optical use, especially as an sealing material for an LED. Peeling-off from a package or a crack of a cured product by a thermal shock is caused not only by a thermal stress due to temperature change but also by an internal stress of the cured product such as a residual stress generated during a curing process. Generally, a cured product formed from a short chain material has high crosslinking density, so that it is difficult to relax the stresses as mentioned above, thereby decreasing its thermal shock resistance. Therefore, also in a cured product using a homopolymer of diphenyl siloxane whereby having refractive index of 1.54 or higher as mentioned above, there have been such problems as peeling-off from a package and a crack of a cured product by a thermal shock test (Patent Document 1 to Patent Document 7).

CITATION LIST

Patent Literature

[Patent Document 1] Japanese Patent Laid-Open Publication No. 2004-186168
[Patent Document 2] Japanese Patent Laid-Open Publication No. 2004-292807
[Patent Document 3] Japanese Patent Laid-Open Publication No. 2004-143361
[Patent Document 4] Japanese Patent Laid-Open Publication No. 2005-105217
[Patent Document 5] Japanese Patent Laid-Open Publication No. 2004-359756
[Patent Document 6] Japanese Patent Laid-Open Publication No. 2007-084766
[Patent Document 7] Japanese Patent Laid-Open Publication No. 2010-132795

SUMMARY OF THE INVENTION

The present invention was made in view of the situation as mentioned above and has an object to provide: a curable organopolysiloxane composition which gives a cured product having high transparency, high refractive index, and excellent thermal shock resistance; an optical device sealing material comprised of the composition; and an optical device having excellent reliability which is sealed by this cured product.

To solve the problems shown above, the present invention provides a curable organopolysiloxane composition containing:

(A) a compound shown by the following average composition formula (1),

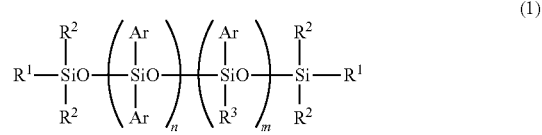

wherein $R^1$ represents the same or different aliphatic unsaturated groups; $R^2$ represents the same or different unsubstituted or substituted monovalent hydrocarbon groups; $R^3$ represents the same or different unsubstituted or substituted aliphatic hydrocarbon groups; Ar represents the same or different unsubstituted or substituted aryl groups which may contain a heteroatom; and "n" and "m" represent positive numbers which satisfy $n \geq 1$, $m \geq 1$, and $n+m \geq 10$, (B) a hydrogen atom-containing organic silicon compound having at least two silicon atom-bonded hydrogen atoms per one molecule while not having an aliphatic unsaturated group, and (C) a hydrosilylation catalyst which contains a platinum group metal.

The curable organopolysiloxane composition of the present invention mentioned above using, as a base polymer, a compound shown by the average composition formula (1) as the component (A) becomes a curable organopolysiloxane which can give a cured product having high transparency, high refractive index, and excellent thermal shock resistance.

Further, it is preferable that the compound shown by the formula (1) of the component (A) be synthesized via a cyclic oligomer shown by the following average composition formula (2),

wherein $R^3$ and Ar represent the same meanings as before; and n' and m' represent positive numbers which satisfy n'≥1 and m'≥1.

When the compound shown by the formula (1) of the component (A) is synthesized via the cyclic oligomer shown by the average composition formula (2), mixing ratio of Ar and $R^3$ in the average composition formula (1) can be easily controlled, so that various properties such as viscosity and refractive index can be controlled easily.

Further, the foregoing curable organopolysiloxane composition may further contain the cyclic oligomer shown by the formula (2).

The cyclic oligomer shown by the formula (2) does not contain a reactive group, so that it is the compound not involving in curing; however, it acts as a plasticizer in certain cases whereby increasing crack resistance of the cured product without adversely affecting physical properties of the cured product obtained.

In addition, Ar in the formula (1) and formula (2) is preferably a phenyl group.

When Ar in the formula (1) and formula (2) is a phenyl group, not only a cured product having even higher refractive index can be obtained but also these compounds can be obtained easily industrially.

In addition, the component (B) is preferably an organohydrogen polysiloxane shown by the following average composition formula (3),

$$R^5{}_b H_c SiO_{(4-b-c)/2} \quad (3)$$

wherein $R^5$ represents the same or different unsubstituted or substituted silicon atom-bonded monovalent hydrocarbon groups other than an aliphatic unsaturated group; and "b" and "c" represent positive numbers which satisfy $0.7 \le b \le 2.1$, $0.001 \le c \le 1.0$, and $0.8 \le b+c \le 3.0$.

In addition, the curable organopolysiloxane composition preferably contains further, as the component (D), an organic silicon compound shown by the following average composition formula (4) and having at least one $R^4 SiO_{3/2}$ unit per one molecule,

$$R^4{}_a SiO_{(4-a)/2} \quad (4)$$

wherein $R^4$ represents the same or different unsubstituted or substituted monovalent hydrocarbon groups, wherein at least one of $R^4$ is an aryl group, and 0.1 to 40 mole % of entirety of $R^4$ is an aliphatic unsaturated group; and "a" represents a positive number which satisfies $1 \le a < 3$.

Furthermore, the curable organopolysiloxane composition can give a cured product having refractive index of 1.54 or higher; and when it is used as an optical material, it is preferable that a cured product having high refractive index of 1.54 or higher be used.

In addition, the present invention provides an optical device sealing material comprised of the curable organopolysiloxane composition.

The organopolysiloxane composition of the present invention can form a cured product not only having high transparency and high refractive index but also being capable of preventing peeling-off from a package and forming of a crack by a thermal shock test from occurring wherein the thermal shock test is done by giving a shock of a low temperature and a high temperature environment repeatedly to the cured product; and thus, the composition is very useful as an optical device sealing material.

Furthermore, the present invention provides an optical device which is sealed by the cured product of the optical device sealing material.

The optical device which is sealed by the cured product of the optical device sealing material is highly reliable.

The curable organopolysiloxane composition of the present invention can give a cured product having high transparency, high refractive index, and excellent thermal shock resistance; and thus, it can be used suitably as an optical device sealing material.

DESCRIPTION OF THE EMBODIMENTS

Hereinafter, the present invention will be explained in more detail.

As mentioned above, a curable organopolysiloxane composition which can give a cured product having high transparency, high refractive index, and excellent thermal shock resistance has been wanted.

Inventors of the present invention carried out an extensive investigation to solve the problems mentioned above, and as a result, it was found that, when a copolymer whose main chain consists of a diaryl siloxane and an alkyl aryl siloxane was used, a curable organopolysiloxane composition which can give a cured product having high transparency, high refractive index, and excellent thermal shock resistance could be obtained; and based on this information, the present invention could be accomplished.

Component (A)

The component (A) is a compound shown by the following average composition formula (1),

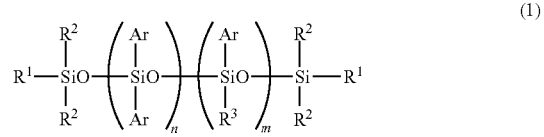

wherein $R^1$ represents the same or different aliphatic unsaturated groups; $R^2$ represents the same or different unsubstituted or substituted monovalent hydrocarbon groups; $R^3$ represents the same or different unsubstituted or substituted aliphatic hydrocarbon groups; Ar represents the same or different unsubstituted or substituted aryl groups which may contain a heteroatom; and "n" and "m" represent positive numbers which satisfy n≥1, m≥1, and n+m≥10.

The component (A) is a linear diorganopolysiloxane whose both ends are blocked by triorganosiloxy groups having an aliphatic unsaturated group as shown by the formula (1). The organopolysiloxane of the component (A) may be used as a sole compound or a mixture of two or more kinds of compounds which have different molecular weights, different silicon atom-bonded organic groups, and so on.

Illustrative example of the aryl group shown by Ar in the formula (1) of the component (A) includes an aromatic hydrocarbon group such as a phenyl group, a benzyl group, a tolyl group, a xylyl group, and a naphthyl group; an aromatic group which contains a heteroatom (O, S, and N) such as a furanyl group; and in addition, the aryl group may optionally contain a substituent group such as a halogen atom (for example, a chlorine atom, a bromine atom, and a fluorine atom). Ar is preferably an unsubstituted aromatic hydrocarbon group having 6 to 10 carbon atoms, especially preferably a phenyl group.

The aliphatic unsaturated group of $R^1$ in the formula (1) is not particularly restricted provided that the composition of the present invention can be kept stably in the uncured state before an addition reaction while the composition can be readily cured after start of the addition reaction, wherein an ethylenic unsaturated group and an acetylenic unsaturated group may be mentioned as illustrative examples thereof. The foregoing aliphatic unsaturated group may be used as a sole group or as a combination of two or more kinds of them.

Here, the term "ethylenic unsaturated group" means an organic group which contains a carbon-carbon double bond while may further contain or not contain a heteroatom such as an oxygen atom, a nitrogen atom, and so forth. Specific example thereof includes an alkenyl group having 2 to 20 carbon atoms, or preferably 2 to 10 carbon atoms, such as a vinyl group, an allyl group, a 5-hexenyl group, a propenyl group, and a butenyl group; an alkadienyl group having 4 to 10 carbon atoms such as 1,3-butadienyl group; a combination of the foregoing alkenyl group and a carbonyloxy group such as an acryloyloxy group (—O(O)CCH=$CH_2$) and a methacryloyloxy group (—O(O)CC($CH_3$)=$CH_2$); and a combination of the foregoing alkenyl group and a carbonyl amino group such as an acrylamide group (—NH(O)CCH=$CH_2$).

The term "acetylenic unsaturated group" means an organic group which contains a carbon-carbon triple bond while may further contain or not contain a heteroatom such as an oxygen atom, a nitrogen atom, and so forth. Specific example thereof includes an alkynyl group having 2 to 20 carbon atoms, or preferably 2 to 10 carbon atoms, such as an ethynyl group and a propargyl group; and a combination of the foregoing alkynyl group and a carbonyloxy group such as an ethynyl carbonyloxy group (—O(O)CC≡CH).

Among the foregoing aliphatic unsaturated groups, in view of productivity and cost in production of raw materials for the component (A), reactivity of the component (A), and so forth, the alkenyl group is preferable; and, an alkenyl group having 2 to 8 carbon atoms such as a vinyl group, an allyl group, and a 5-hexenyl group are more preferable; and a vinyl group is especially preferable.

Illustrative example of the unsubstituted or substituted monovalent hydrocarbon group of $R^2$ in the formula (1) of the component (A) includes the afore-mentioned aliphatic unsaturated groups and monovalent hydrocarbon groups other than these aliphatic unsaturated groups, such as an alkyl group having 1 to 6 carbon atoms such as a methyl group, an ethyl group, a propyl group, an isopropyl group, a butyl group, an isobutyl group, a sec-butyl group, and a tert-butyl group; a haloalkyl group having 1 to 4 carbon atoms such as a chloromethyl group and a 3,3,3-trifluoropropyl group; and an aryl group having 6 to 10 carbon atoms such as a phenyl group and a tolyl group. Among them, an alkyl group having 1 to 6 carbon atoms, a phenyl group, and a vinyl group are preferable, and a methyl group is especially preferable.

Illustrative example of the unsubstituted or substituted aliphatic hydrocarbon group of $R^3$ in the formula (1) of the component (A) includes the afore-mentioned aliphatic unsaturated groups and monovalent hydrocarbon groups other than these aliphatic unsaturated groups, such as the alkyl group having 1 to 6 carbon atoms and the haloalkyl group having 1 to 4 carbon atoms, which were shown as the examples mentioned above. Among them, an alkyl group having 1 to 6 carbon atoms is preferable, and a methyl group is especially preferable.

In the component (A), each of "n" and "m" represents a positive number of 1 or more, wherein n+m needs to be 10 or more. Each of them independently represents preferably 1 to 100, more preferably 1 to 25, and especially preferably 1 to 15. The sum n+m is preferably 10 to 100, more preferably 10 to 50, and especially preferably 10 to 30. If n+m is less than 10, crosslinking density of the cured product becomes so high that it may cause decrease in thermal shock resistance. Furthermore, ratio of n to m is preferably 8:2 to 2:8, or especially preferably 7:3 to 3:7.

The component (A) may be obtained by a method wherein after a bifunctional silane such as dichloro diphenyl silane and dichloro methyl phenyl silane is hydrolysis-condensed and then the product thereof is isolated or simultaneously with the hydrolysis condensation reaction thereof, the ends of the product are blocked by a end-blocking agent which contains an aliphatic unsaturated group. Especially, it is preferable to obtain the component by a method wherein after the above-mentioned bifunctional silane is hydrolysis-condensed and then the product thereof is isolated as the cyclic oligomer shown by the following average composition formula (2), the ends of the product are blocked by an end-blocking agent which contains an aliphatic unsaturated group,

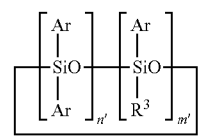

(2)

wherein $R^3$ and Ar represent the same meanings as before; and n' and m' represent positive numbers which satisfy n'≥1 and m'≥1.

When the compound shown by the formula (1) of the component (A) is synthesized via the cyclic oligomer shown by the average composition formula (2) as mentioned above, mixing ratio of Ar and $R^3$ in the average composition formula (1) can be controlled more easily as compared with the case that end blocking is done simultaneously with the hydrolysis condensation reaction without going through via the cyclic oligomer; and thus, various properties such as viscosity and refractive index can be controlled easily.

Blocking of the end may be done, for example, by a method wherein the cyclic oligomer is mixed with an end blocking agent which contains an aliphatic unsaturated group, such as dimethyl diphenyl divinyl disiloxane and tetramethyl divinyl disiloxane, and then, equilibration thereof is carried out by using a base catalyst such as potassium hydroxide and sodium hydroxide.

Further, the curable organopolysiloxane of the present invention may contain the cyclic oligomer shown by the average composition formula (2) simultaneously with the compound shown by the formula (1) (component (A)). This cyclic oligomer does not contain a reactive group, so that it is the compound not involving in curing; however, it acts as a plasticizer in certain cases, so that it may be expected to increase crack resistance of the cured product without adversely affecting physical properties of the cured product obtained.

Component (B)

The component (B) is a hydrogen atom-containing organic silicon compound (SiH group-containing organic compound) having at least two, or preferably at least three of the silicon atom-bonded hydrogen atom (namely, the SiH group) per one molecule while not having an aliphatic unsaturated group; and it acts as a crosslinking agent by hydrosilylation addition reaction with the component (A). The component (B) may be used as a sole compound or as a mixture of two or more kinds of the compounds. Any compound which is in the public domain may be used as the component (B) provided that the compound is the organic silicon compound having at least two SiH groups per one molecule while not having an aliphatic unsaturated group; and illustrative example thereof includes an organohydrogen polysiloxane, an organohydrogen silane, an organic oligomer, and an organic polymer provided that these compounds contain at least two SiH groups per one molecule, while an organohydrogen polysiloxane having at least two SiH groups per one molecule is especially preferable.

The organic group which is bonded to a silicon atom in the component (B) does not contain an aliphatic unsaturated group but is an unsubstituted monovalent hydrocarbon group or a monovalent hydrocarbon group substituted with a group (atom), which does not adversely affect storage stability and curing properties of the composition of the present invention, such as a halogen atom (for example, a chlorine atom, a bromine atom, and a fluorine atom), an epoxy group-containing group (for example, an epoxy group, a glycidyl group, and a glycidoxy group), and an alkoxy group (for example, a methoxy group, an ethoxy group, a propoxy group, and a butoxy group). Illustrative example of the monovalent hydrocarbon group mentioned above includes the alkyl groups having 1 to 6 carbon atoms, the haloalkyl groups having 1 to 4 carbon atoms, and the aryl groups having 6 to 10 carbon atoms, these groups having been specifically shown as the unsubstituted or substituted monovalent hydrocarbon groups of $R^2$ in the formula (1) of the component (A). The organic group is preferably an alkyl group having 1 to 6 carbon atoms or an aryl group having 6 to 10 carbon atoms, while a methyl group or a phenyl group is more preferable. Further, when the monovalent hydrocarbon groups contain any one of an epoxy-containing group and an alkoxy-containing group or both as the substituent thereof, a cured product of the composition of the present invention may be provided with an adhesion property.

Molecular structure of the organohydrogen polysiloxane is not particularly restricted provided that the component (B) is the organohydrogen polysiloxane having at least two SiH groups per one molecule; and usable example thereof includes conventionally produced various organohydrogen polysiloxanes having a structure such as a linear, a cyclic, a branched chain, and a three-dimensional network (resin-like) structure.

The above-mentioned organohydrogen polysiloxane contains at least two SiH groups per one molecule (usually 2 to about 300). When the organohydrogen polysiloxane has a linear chain structure or a branched chain structure, these SiH groups may be located any one of the molecular chain end and the molecular chain non-end or both.

Number of the silicon atoms per one molecule of the organohydrogen polysiloxane (polymerization degree) is preferably 2 to 1000, or more preferably 3 to 200. In addition, the organohydrogen polysiloxane is preferably in the state of liquid at 25° C., and the viscosity thereof measured by a rotational viscometer at 25° C. is preferably 1 to 1000 mPa·s, or more preferably about 10 to about 100 mPa·s.

As to the organohydrogen polysiloxane, for example, a compound shown by the following average composition formula (3) may be used,

(3)

wherein $R^5$ represents the same or different unsubstituted or substituted silicon atom-bonded monovalent hydrocarbon groups other than an aliphatic unsaturated group; and "b" and "c" represent positive numbers which satisfy $0.7 \leq b \leq 2.1$, $0.001 \leq c \leq 1.0$, and $0.8 \leq b+c \leq 3.0$, or preferably $1.0 \leq b \leq 2.0$, $0.01 \leq c \leq 1.0$, and $1.5 \leq b+c \leq 2.5$.

Illustrative example of $R^5$ includes the unsubstituted or substituted monovalent hydrocarbon groups other than an aliphatic unsaturated group—the hydrocarbon groups specifically mentioned as $R^2$ in the formula (1) of the component (A)—, such as an alkyl group having 1 to 6 carbon atoms or a haloalkyl group and an aryl group having 6 to 10 carbon atoms. $R^5$ is preferably an alkyl group having 1 to 6 carbon atoms or an aryl group having 6 to 10 carbon atoms, or more preferably a methyl group or a phenyl group.

Illustrative example of the organohydrogen polysiloxane shown by the average composition formula (3) includes a cyclic compound which contains at least four organohydrogen siloxane unit shown by the formula of $R^5HSiO$, a compound shown by the formula of $R^5_3SiO(HR^5SiO)_dSiR^5_3$, a compound shown by the formula of $HR^5_2SiO(HR^5SiO)_dSiR^5_2H$, and a compound shown by the formula of $HR^5_2SiO(HR^5SiO)_d(R^5_2SiO)_eSiR^5_2H$. In the above-mentioned formulae, $R^5$ represents the same meaning as before and "d" and "e" represent at least one.

Alternatively, the organohydrogen polysiloxane shown by the average composition formula (3) may be the one which contains a siloxane unit shown by the formula of $HSiO_{1.5}$, and a siloxane unit shown by the formula of $R^5HSiO$ and/or a siloxane unit shown by the formula of $R^5_2HSiO_{0.5}$ or both. The organohydrogen polysiloxane may contain a monoorganosiloxane unit not containing a SiH group, a diorganosiloxane unit, a triorganosiloxane unit and/or a $SiO_{4/2}$ unit. $R^5$ in the above formula represents the same meaning as before.

It is preferable that the organohydrogen polysiloxane shown by the average composition formula (3) contain 30 to 100 mole % of methyl hydrogen siloxane unit relative to totality of the organosiloxane units contained therein.

In the case that the component (B) is an organohydrogen polysiloxane having at least two SiH groups per one molecule, specific example thereof includes 1,1,3,3-tetramethyl disiloxane, 1,3,5,7-tetramethyl cyclotetrasiloxane, tris(hydrogendimethylsiloxy)methyl silane, tris(hydrogendimethylsiloxy)phenyl silane, methyl hydrogen cyclopolysiloxane, methyl hydrogen siloxane-dimethyl siloxane cyclic copolymer, methylhydrogen polysiloxane whose both chain ends are blocked by trimethyl siloxy groups, dimethyl siloxane-methyl hydrogen siloxane copolymer whose both chain ends are blocked by trimethyl siloxy groups, diphenyl siloxane-methyl hydrogen siloxane copolymer whose both chain ends are blocked by trimethyl siloxy groups, methyl phenyl siloxane-methyl hydrogen siloxane copolymer whose both chain ends are blocked by trimethyl siloxy groups, dimethyl siloxane-methyl hydrogen siloxane-methyl phenyl siloxane copolymer whose both chain ends are blocked by trimethyl siloxy groups, dimethyl siloxane-methyl hydrogen siloxane-diphenyl siloxane copolymer whose both chain ends are blocked by trimethyl siloxy groups, methylhydrogen polysiloxane whose both chain ends are blocked by dimethyl hydrogen siloxy groups, dimethyl polysiloxane whose both chain ends are blocked by dimethyl hydrogen siloxy groups, dimethyl siloxane-methyl hydrogen siloxane copolymer whose both chain ends are blocked by dimethyl hydrogen siloxy groups, dimethyl siloxane-methyl phenyl siloxane copolymer whose both chain ends are blocked by dimethyl hydrogen siloxy groups, dimethyl siloxane-diphenyl siloxane copolymer whose both chain ends are blocked by dimethyl hydrogen siloxy groups, methyl phenyl polysiloxane whose both chain ends are blocked by dimethyl hydrogen siloxy groups, diphenyl polysiloxane whose both chain ends are blocked by dimethyl hydrogen siloxy groups, diphenyl siloxane-methyl, hydrogen siloxane copolymer whose both chain ends are blocked by dimethyl hydrogen siloxy groups, an organohydrogen polysiloxane wherein a part of or entirety of the methyl groups in the above-mentioned compounds are substituted with other alkyl groups such as an ethyl group and a propyl group, an organosiloxane copolymer comprising a siloxane unit shown by the formula $R^5{}_3SiO_{0.5}$, a siloxane unit shown by the formula $R^5{}_2HSiO_{0.5}$, and a siloxane unit shown by the formula $SiO_2$, an organosiloxane copolymer comprising a siloxane unit shown by the formula $R^5{}_2HSiO_{0.5}$ and a siloxane unit shown by the formula $SiO_2$, an organosiloxane copolymer comprising a siloxane unit shown by the formula $R^5HSiO$ and any one of a siloxane unit shown by the formula $R^5SiO_{1.5}$ and a siloxane unit shown by the formula $HSiO_{1.5}$ or both, and a mixture of two or more kinds of the above-mentioned organopolysiloxanes. $R^5$ in the above formulae represents the same meaning as before.

Amount of the component (B) to be used is such that the composition of the present invention may be cured fully in the presence of a hydrosilylation catalyst of the component (C); but usually, the amount thereof is preferably 0.2 to 5, or more preferably 0.5 to 2 as the mole ratio of the SiH group in the component (B) to the aliphatic unsaturated group in the component (A) (if the component (D) mentioned later is used, totality of the component (A) and the component (D)).

Component (C)

As to the hydrosilylation catalyst which contains a platinum group metal of the component (C) (platinum group metal based hydrosilylation catalyst), any catalyst may be used provided that it can facilitate a hydrosilylation addition reaction between the silicon atom-bonded aliphatic unsaturated group in the component (A) and the SiH group in the component (B). The component (C) may be used as a sole catalyst or as a mixture of two or more kinds of the catalysts.

Illustrative example of the component (C) includes a platinum group metal such as platinum, palladium, and rhodium; chloropalatinic acid, an alcohol-modified chloroplatinic acid; a coordination compound of chloroplatinic acid with an olefin, a vinyl siloxane, or an acetylenic compound; and a platinum metal compound such as tetrakis(triphenylphosphine) palladium and chlorotris(triphenylphosphine) rhodium, while a platinum compound is especially preferable.

Amount of the component (C) to be added is such that the amount is effective as the hydrosilylation catalyst; and thus, it is preferably in the range of 0.1 to 1000 ppm, or more preferably 1 to 500 ppm, based on mass of the platinum group metal element relative to totality of the component (A) and the component (B) (if the component (D) mentioned later is used, totality of the component (A), component (B), and the component (D)).

Into the composition of the present invention, it is preferable to further add the component (D) as mentioned below.

Component (D)

The component (D) is an organic silicon compound which contains at least one $R^4SiO_{3/2}$ unit per one molecule and is shown by the following average composition formula (4), $$R^4{}_aSiO_{(4-a)/2} \quad (4)$$

wherein $R^4$ represents the same or different unsubstituted or substituted monovalent hydrocarbon groups, wherein at least one of $R^4$ is an aryl group, and 0.1 to 40 mole % of entirety of $R^4$ is an aliphatic unsaturated group; and "a" represents a positive number which satisfies $1 \leq a < 3$.

Illustrative example of the aliphatic unsaturated group in the component (D) includes the ethylenic unsaturated group and the acetylenic unsaturated group which have been specifically mentioned as $R^1$ in the formula (1) of the component (A), while a vinyl group is especially preferable.

Content of the $R^4SiO_{3/2}$ unit in the component (D) is preferably 10 to 90 mole %, or especially preferably 50 to 80 mole %, relative to totality of the units in the organic silicon compound shown by the average composition formula (4).

Content of the aliphatic unsaturated group in the component (D) is preferably 0.1 to 40 mole %, or especially preferably 0.2 to 20 mole %, relative to the monovalent organic group which is bonded to a silicon atom (namely, the unsubstituted or substituted monovalent hydrocarbon group shown by $R^4$ in the average composition formula (4)).

In addition, it is preferable that the component (D) contain at least one silicon atom-bonded aryl group per one molecule. Illustrative example of the aryl group includes the aromatic hydrocarbon groups or the heteroatom-containing aromatic groups shown as specific examples of Ar in the formula (1) of the component (A), wherein the aryl groups may further contain a substituent such as a halogen atom. The aryl groups are preferably a usual group having 6 to 14 carbon atoms or more preferably 6 to 10 carbon atoms, such as a phenyl group, a tolyl group, a xylyl group, and a naphthyl group, while a phenyl group is especially preferable.

Content of the aryl group in the component (D) is preferably at least 5 mole % in the silicon atom-bonded monovalent organic group (namely, the unsubstituted or substituted monovalent hydrocarbon group shown by $R^4$ in the average composition formula (4)). If content of the aryl group is 5 mole % or more in the silicon atom-bonded monovalent organic group, a cured covering protective material obtained therefrom has excellent heat resistance and low-temperature properties, so that there is no risk of decrease in reliability by a thermal shock test; and thus, content of the aryl group therein is preferably at least 5 mole %, or especially preferably 30 mole % or more. The upper limit thereof is not particularly stipulated, but preferably 80 mole % or less, or especially preferably 70 mole % or less, in the silicon atom-bonded monovalent organic group.

Illustrative example of the silicon atom-bonded organic group other than the aliphatic unsaturated group and the aryl group in the component (D) includes a monovalent hydrocarbon group which has usually 1 to 12 carbon atoms, or preferably 1 to about 10 carbon atoms, and may be unsubstituted or substituted by a halogen atom; and thus, included therein are an alkyl group such as a methyl group, an ethyl group, a propyl group, a butyl group, a pentyl group, a hexyl group, a cyclohexyl group, and a heptyl group; an aralkyl group such as a benzyl group and a phenethyl group; and a halogenated alkyl group such as a chloromethyl group, a 3-chloropropyl group, and 3,3,3-trifluoropropyl group.

Further, "a" in the average composition formula (4) is a positive number which satisfies $1 \leq a < 3$, wherein molecular structure of this component may be any of a linear and a branched structure.

In the case that this component (D) is of a linear structure, viscosity thereof as measured by a rotational viscometer is preferably in the range of 100 to 20,000 mPa·s, or especially preferably about 500 to 10,000 mPa·s at 25° C. in view of workability. If the viscosity is too low, there is a risk of forming a burr by molding thereof because of excessive flowability; while if the viscosity is too high, there is a risk that removal of air bubbles incorporated thereinto during mixing of necessary ingredients is difficult. Meanwhile, in the case of branched structure, the state thereof is a liquid or a solid state; and in the case of a liquid state, viscosity thereof is preferably in the range of about 1,000 to about 5,000 mPa·s at 25° C. In the case of a solid state, it is preferable to use it as a mixture with a linear organopolysiloxane which can dissolve this compound such that viscosity of the mixture may become 100 to 20,000 mPa·s at 25° C.

By blending the component (D), appropriate hardness and strength may be given more easily to a cured product of the composition.

Blending amount of the component (D) is, as the blending ratio of the component (A) to the component (D) (mass ratio), preferably 100:0 to 30:70, more preferably 90:10 to 35:65, or still more preferably 80:20 to 40:60. If blending amount of the component (D) is too small, there is a risk of insufficient blending effect of the component (D); while if the amount is too large, there is a risk of decrease in the crack resistance.

Other Component

Into the composition of the present invention, an arbitrary component other than the components (A) to (D) may be added. Specific example thereof includes the compounds shown below. These compounds may be used as a sole compound or as a mixture of two or more kinds of them.

Compounds Containing an Aliphatic Unsaturated Group Other than Components (A) and (D)

The composition of the present invention may be added with, other than the components (A) and (D), an organopolysiloxane compound which contains an aliphatic unsaturated group capable of undergoing an addition reaction with the component (B). The compound which contains an aliphatic unsaturated group like this other the components (A) and (D) is preferably those which can involve in forming the cured product; and as to the example thereof, an organopolysiloxane having at least one aliphatic unsaturated group per one molecule other than the components (A) and (D) may be mentioned. Structure thereof may be any of, for example, linear, cyclic, branched, and three-dimensional network.

Alternatively, an organic compound which contains an aliphatic unsaturated group other than the above-mentioned organopolysiloxane may be blended. Specific example of the compound which contains an aliphatic unsaturated group includes a monomer such as butadiene and a diacrylate derived from a polyfunctional alcohol; a polyolefin such as polyethylene, polypropylene or a copolymer of styrene with other ethylenic unsaturated compound (for example, acrylonitrile or butadiene); and an oligomer or a polymer derived from an organic compound which is substituted with a functional such as an ester of acrylic acid, methacrylic acid, or maleic acid. The compound which contains an aliphatic unsaturated group other than the components (A) and (D) may be liquid or solid at room temperature.

Controlling Agent of the Addition Reaction

To secure the pot life, a controlling agent of the addition reaction may be blended to the composition of the present invention. The controlling agent of the addition reaction is not particularly restricted provided that it has an effect of cure-inhibition to a hydrosilylation catalyst of the component (C); and thus, those heretofore known may be used. Specific example thereof includes a phosphorous-containing compound such as triphenyl phosphine; a nitrogen-containing compound such as tributylamine, tetramethyl ethylenediamine, and benzotriazole; a sulfur-containing compound; an acetylene-type compound such as an acetylene alcohols (for example, 1-ethynylcyclohexanol and 3,5-dimethyl-1-hexyne-3-ol); a compound which contains two or more of alkenyl groups; a hydroperoxy compound; and a maleic acid derivative.

Degree of the cure-inhibition effect by the controlling agent of the addition reaction is different depending on chemical structure of the controlling agent of the addition reaction. Accordingly, it is preferable that the adding amount thereof be appropriately controlled in accordance with respective controlling agents of the addition reaction to be used. When optimum amount of the controlling agent of the addition reaction is added, the composition thereof becomes excellent in storage stability for a long period of time at room temperature as well as in thermal cure properties. The adding amount thereof is usually 0.0001 to 5 parts by mass, or especially 0.001 to 2 parts by mass, relative to 100 parts by mass of the component (A) (if the component (D) is added thereinto, totality of the component (A) and the component (D)).

Other Arbitrary Components

To suppress discoloration, cloudiness, oxidative degradation, and so on of the cured product, a heretofore known antioxidant such as 2,6-di-t-butyl-4-methylphenol may be added to the composition of the present invention. In addition, to give a resistance to photo-deterioration, a light stabilizer such as a hindered amine-type stabilizer may also be added to the composition of the present invention. Further, an inorganic filler such as fumed silica may be added to increase strength within the range not affecting transparency of the cured product obtained from the composition of the present invention; and in addition, a dye, a pigment, a flame retardant, and so on may be added to the composition of the present invention, if necessary.

Cured Product

The curable organopolysiloxane composition of the present invention can be cured by a heretofore known method under a heretofore known condition. Specifically, the composition can be cured by heating usually at 80 to 200° C., or preferably at 100 to 160° C. Heating time is sufficient in the range of about 0.5 minute to 5 hours, or especially about 1 minute to 3 hours; but in the case that high precision is required in LED encapsulation and the like, a longer cure time is preferable. Form of the cured product to be obtained is not particularly restricted; and thus, for example, any of a cured gel, a cured elastomer, and a cured resin may be allowed. The cured products are usually colorless and transparent, and have high refractive index (refractive index of 1.54 or higher, especially in the range of 1.54 to 1.65). In the cured product, peeling-off from the package and crack of the cured product by a thermal shock test wherein a shock of a low temperature and a high temperature environment is repeatedly given thereto can be prevented from occurring.

Optical Device Sealing Material and Optical Device

The cured product of the composition of the present invention has excellent heat resistance, cold resistance, and electrical insulation properties, similarly to a cured product of a usual curable organopolysiloxane composition. Illustrative example of the optical device which is sealed by the sealing material comprised of the composition of the present invention includes an LED, a semiconductor laser, a photodiode, a phototransistor, a solar cell, and CCD, and so on. The optical device is sealed as follows; the optical device mentioned above is applied with the sealing material comprised of the composition of the present invention, and then, the applied sealing material is cured by a heretofore known method under a heretofore known condition, specifically by the method which is described above.

EXAMPLES

Hereinafter, the present invention will be explained specifically by showing Preparation Examples, Examples, and Comparative Examples; but the present invention is not restricted by these Examples.

Meanwhile, in the followings, viscosities are measured values by using a rotational viscometer at 25° C. Refractive indexes were measured by using a digital refractometer RX-5000 (manufactured by ATAGO Co., Ltd.) at 589 nm at 25° C. Hardness was measured in accordance with JIS-K6249.

In the followings, symbols which are used to show an average composition of a silicone oil or a silicone resin represent the following units. Mole number of each silicone oil or each silicone resin shows mole number of the vinyl group or the SiH group contained in each component.

$M^H$: $(CH_3)_2HSiO_{1/2}$
$M^{Vi}$: $(CH_2\!=\!CH)(CH_3)_2SiO_{1/2}$
$M^{\Phi Vi}$: $(CH_2\!=\!CH)(C_6H_5)(CH_3)SiO_{1/2}$
D: $(CH_3)_2SiO_{2/2}$
$D^{Vi}$: $(CH_2\!=\!CH)(CH_3)SiO_{2/2}$
$D^\Phi$: $(C_6H_5)_2SiO_{2/2}$
$D^{\Phi Me}$: $(C_6H_5)(CH_3)SiO_{2/2}$
$T^\Phi$: $(C_6H_5)SiO_{3/2}$

Preparation Example 1

Preparation of Platinum Catalyst

A reaction product between hexachloroplatinic acid and 1,3-divinyl tetramethyl disiloxane was diluted in a silicone oil having the average composition formula of $M^{Vi}{}_2D_{19}D^\Phi{}_9$ with viscosity of 0.7 Pa·s such that content of platinum therein may become 1.0% by mass to obtain a platinum catalyst (Catalyst A) to be used in Examples and Comparative Examples.

Preparation Example 2

Synthesis of Cyclic Oligomer of $D^\Phi{}_2D^{\Phi Me}{}_2$

Into a 2-L flask were taken 750 g of water and 510 g of toluene; and after they were heated to 80° C., a mixture solution of 290 g of dichloro diphenyl silane and 220 g of dichloro methyl phenyl silane was gradually added thereinto in such a way that temperature inside the mixture might not be raised beyond 85° C. Thereafter, stirring thereof was continued at 80 to 85° C. for 4 hours. After it was cooled to room temperature, a water layer was separated. An organic layer was washed with an aqueous sodium sulfate solution; and then, after 0.09 g of potassium hydroxide was added thereinto, stirring thereof was continued at 108 to 113° C. for 5 hours. After it was cooled to room temperature, 0.44 g of chloro trimethyl silane and 1.8 g of potassium acetate were added thereinto; and then, stirring thereof was continued for 2 hours. Then, 4 g of activated carbon was added thereinto and then removed by filtration after the resulting mixture was stirred for 2 hours at room temperature; and then, toluene was removed by concentration under reduced pressure. The obtained liquid was filtrated to obtain a colorless, transparent cyclic oligomer having the average composition formula of $D^\Phi{}_2D^{\Phi Me}{}_2$.

Preparation Example 3

Synthesis Of Silicone Oil Having the Average Composition Formula of $M^{\Phi vi}{}_2D^\Phi{}_3D^{\Phi Me}{}_3$ Into a 500-mL flask were taken 143 g of the above-mentioned cyclic oligomer, 44.3 g of dimethyl diphenyl divinyl disiloxane, and 0.15 g of potassium hydroxide; and then, stirring thereof was continued at 160 to 170° C. for 24 hours. After it was cooled to 130° C., 3 g of ethylene chlorohydrin was added thereinto; and then, stirring thereof was continued for 12 hours at the same temperature. Thereafter, unreacted dimethyl diphenyl divinyl disiloxane was removed by concentration under reduced pressure; and after it was cooled to room temperature, 1.9 g of activated carbon was added thereinto, and then, stirring thereof was continued for 2 hours. The activated carbon was removed by filtration to obtain a colorless, transparent silicone oil having the average composition formula of $M^{\Phi vi}{}_2MD^\Phi{}_3D^{\Phi Me}{}_3$. Ratio of the cyclic oligomer in the obtained silicone oil was 12%.

Preparation Example 4

Synthesis Of Silicone Oil Having the Average Composition Formula of $M^{\Phi vi}{}_2D^\Phi{}_6D^{\Phi Me}{}_6$ A silicone oil having the average composition formula of $M^{\Phi vi}{}_2D^\Phi{}_6D^{\Phi Me}{}_6$ was obtained according to Preparation Example 3 except that a charging ratio of the cyclic oligomer to dimethyl diphenyl divinyl disiloxane was changed. Ratio of the cyclic oligomer in the obtained silicone oil was 16%.

Preparation Example 5

Synthesis of Silicone Oil Having the Average Composition Formula of $M^{\Phi vi}{}_2D^\Phi{}_8D^{\Phi Me}{}_8$ A silicone oil having the average composition formula of $M^{\Phi vi}{}_2D^\Phi{}_8D^{\Phi Me}{}_8$ was obtained according to Preparation Example 3 except that a charging ratio of the cyclic oligomer to dimethyl diphenyl divinyl disiloxane was changed. Ratio of the cyclic oligomer in the obtained silicone oil was 19%.

Preparation Example 6

Synthesis of Silicone Oil Having the Average Composition Formula of $M^{vi}{}_2D^\Phi{}_3D^{\Phi Me}{}_3$ Into a 1-L flask were taken 334 g of the above-mentioned cyclic oligomer, 77.5 g of tetramethyl divinyl disiloxane, and 0.33 g of potassium hydroxide; and then, stirring thereof was continued at 140 to 150° C. for 8 hours. After it was cooled to 100° C., 6.6 g of ethylene chlorohydrin was added thereinto; and then, stirring thereof was continued for 12 hours at the same temperature. Thereafter, unreacted tetramethyl divinyl disiloxane was removed by concentration under reduced pressure; and after it was cooled to room temperature, 4.5 g of activated carbon was added thereinto, and then, stirring thereof was continued for 2 hours. The activated carbon was removed by filtration to obtain a colorless, transparent silicone oil having the average composition formula of $M^{vi}{}_2D^\Phi{}_8D^{\Phi Me}{}_3$. Ratio of the cyclic oligomer in the obtained silicone oil was 12%.

Preparation Example 7

Synthesis of Silicone Oil Having the Average Composition Formula of $M^{vi}{}_2D^\Phi{}_8D^{\Phi Me}{}_8$ A silicone oil having the average composition formula of $M^{vi}{}_2D^\Phi{}_8D^{\Phi Me}{}_8$ was obtained according to Preparation Example 6 except that a charging ratio of the cyclic oligomer to tetramethyl divinyl disiloxane was changed. Ratio of the cyclic oligomer in the obtained silicone oil was 21%.

Example 1

A mixture of 26 g of silicone oil having the average composition formula of $M^{\Phi vi}{}_2D^\Phi{}_6D^{\Phi Me}{}_6$ as the component (A), 52 g of silicone resin having the average composition formula of $M^{vi}_1T^{\Phi}_3$ as the component (D), and 19 g of organohydrogen polysiloxane having the average composition formula of $M^H_2D^{\Phi}_1$ as the component (B) was mixed with 0.03 g of 3-methyl-1-dodecyn-3-ol as the controlling agent and 0.05 g of Catalyst A as the component (C) to obtain an organopolysiloxane composition of the present invention. This composition was cured by heating at 100° C. for 2 hours and further at 150° C. for 4 hours; and then, physical properties of the obtained elastomer was measured. Each of the measurement results and results of the thermal shock test are shown in Table 1.

Example 2

A mixture of 26 g of silicone oil having the average composition formula of $M^{\Phi vi}_2D^{\Phi}_8D^{\Phi Me}_8$ as the component (A), 53.2 g of silicone resin having the average composition formula of $M^{vi}_1T^{\Phi}_3$ as the component (D), and 17.8 g of organohydrogen polysiloxane having the average composition formula of $M^H_2D^{\Phi}_1$ as the component (B) was mixed with 0.03 g of 3-methyl-1-dodecyn-3-ol as the controlling agent and 0.05 g of Catalyst A as the component (C) to obtain an organopolysiloxane composition of the present invention. This composition was cured by heating at 100° C. for 2 hours and further at 150° C. for 4 hours; and then, physical properties of the obtained elastomer was measured. Each of the measurement results and results of the thermal shock test are shown in Table 1.

Example 3

A mixture of 26.8 g of silicone oil having the average composition formula of $M^{vi}_2D^{\Phi}_8D^{\Phi Me}_8$ as the component (A), 53.6 g of silicone resin having the average composition formula of $M^{Vi}_1T^{\Phi}_3$ as the component (D), and 15.6 g of organohydrogen polysiloxane having the average composition formula of $M^H_2D^{\Phi}_1$ as the component (B) was mixed with 0.03 g of 3-methyl-1-dodecyn-3-ol as the controlling agent and 0.05 g of Catalyst A as the component (C) to obtain an organopolysiloxane composition of the present invention. This composition was cured by heating at 100° C. for 2 hours and further at 150° C. for 4 hours; and then, physical properties of the obtained elastomer was measured. Each of the measurement results and results of the thermal shock test are shown in Table 1.

Comparative Example 1

A mixture of 25.5 g of silicone oil having the average composition formula of $M^{\Phi vi}_2D^{\Phi}_3D^{\Phi Me}_3$, 50.9 g of silicone resin having the average composition formula of $M^{Vi}_1T^{\Phi}_3$, and 20.6 g of organohydrogen polysiloxane having the average composition formula of $M^H_2D^{\Phi}_1$ was mixed with 0.03 g of 3-methyl-1-dodecyn-3-ol as the controlling agent and 0.05 g of Catalyst A to obtain an organopolysiloxane composition. This composition was cured by heating at 100° C. for 2 hours and further at 150° C. for 4 hours; and then, physical properties of the obtained elastomer was measured. Each of the measurement results and results of the thermal shock test are shown in Table 2.

Comparative Example 2

A mixture of 24 g of silicone oil having the average composition formula of $M^{vi}_2D^{\Phi}_3D^{\Phi Me}_3$, 51 g of silicone resin having the average composition formula of and 18.5 g of organohydrogen polysiloxane having the average composition formula of $M^H_2D^{\Phi Me}_1$ was mixed with 0.03 g of 3-methyl-1-dodecyn-3-ol as the controlling agent and 0.05 g of Catalyst A to obtain an organopolysiloxane composition. This composition was cured by heating at 100° C. for 2 hours and further at 150° C. for 4 hours; and then, physical properties of the obtained elastomer was measured. Each of the measurement results and results of the thermal shock test are shown in Table 2.

Comparative Example 3

A mixture of 22 g of silicone oil having the average composition formula of $M^{\Phi vi}_2D^{\Phi}_{3.6}$, 53 g of silicone resin having the average composition formula of and 22 g of organohydrogen polysiloxane having the average composition formula of $M^H_2D^{\Phi}_1$ was mixed with 0.03 g of 3-methyl-1-dodecyn-3-ol as the controlling agent and 0.05 g of Catalyst A to obtain an organopolysiloxane composition. This composition was cured by heating at 100° C. for 2 hours and further at 150° C. for 4 hours; and then, physical properties of the obtained elastomer was measured. Each of the measurement results and results of the thermal shock test are shown in Table 2.

Comparative Example 4

A mixture of 55.1 g of silicone oil having the average composition formula of $M^{\Phi vi}_2D^{\Phi}_{3.6}$, 45 g of silicone resin having the average composition formula of $D^{Vi}_1T^{\Phi}_4$, and 28.6 g of organohydrogen polysiloxane having the average composition formula of $M^H_2D^{\Phi}_1$ was mixed with 0.2 g of 3-methyl-1-dodecyn-3-ol as the controlling agent and 0.3 g of Catalyst A to obtain an organopolysiloxane composition. This composition was cured by heating at 100° C. for 2 hours and further at 150° C. for 4 hours; and then, physical properties of the obtained elastomer was measured. Each of the measurement results and results of the thermal shock test are shown in Table 2.

Comparative Example 5

A mixture of 51.9 g of silicone oil having the average composition formula of $M^{\Phi vi}_2D^{\Phi}_{3.6}$, 14.5 g of silicone resin having the average composition formula of $D^{Vi}_1T^{\Phi}_4$, and 44.3 g of organohydrogen polysiloxane having the average composition formula of $M^H_2D^H_2D^{\Phi}_2$ was mixed with 0.04 g of 3-methyl-1-dodecyn-3-ol as the controlling agent and 0.42 g of Catalyst A to obtain an organopolysiloxane composition. This composition was cured by heating at 100° C. for 2 hours and further at 150° C. for 4 hours; and then, physical properties of the obtained elastomer was measured. Each of the measurement results and result of the thermal shock test are shown in Table 2.

Evaluation Method

Test Piece for the Thermal Shock Test

Each of test pieces for the thermal shock test was prepared by burying a nut with a nominal diameter of M5 and a spring washer into an sealing resin. Here, the sealing resin which is the cured product of the organopolysiloxane composition obtained in respective Examples and Comparative Examples was used. The organopolysiloxane composition was cured under the condition at 100° C. for 2 hours and further at 150° C. for 4 hours.

Test Method for Thermal Shock Resistance

The test was executed with referring to the thermal cycle test method (hereinafter, abbreviated as "TCT method") for "JIS C 2105 non-solvent liquid state resin for electrical insulation". The test piece was subjected to cold-hot thermal shock of −40° C. and 100° C. repeatedly; and then, change in the appearance thereof was visually checked. The results thereof are shown in Table 1. Meanwhile, when a crack was confirmed in the resin, it was judged to be NG (no good).

TABLE 1

|  |  | Example 1 | Example 2 | Example 3 |
|---|---|---|---|---|
| Appearance |  | Colorless & transparent | Colorless & transparent | Colorless & transparent |
| Hardness (Type A) |  | 60 | 56 | 87 |
| Refractive index (nD$^{25}$) |  | 1.55 | 1.55 | 1.55 |
| TCT Method: | nut | Good | Good | Good |
|  | washer | Good | Good | Good |

TABLE 2

|  |  | Comparative Example 1 | Comparative Example 2 | Comparative Example 3 | Comparative Example 4 | Comparative Example 5 |
|---|---|---|---|---|---|---|
| Appearance |  | Colorless & transparent | Colorless & transparent | Colorless & transparent | Colorless & transparent | Colorless & transparent |
| Hardness* |  | 85 (A) | 27 (A) | 40 (D) | 50 (D) | 55 (D) |
| Refractive index (nD$^{25}$) |  | 1.55 | 1.55 | 1.55 | 1.57 | 1.58 |
| TCT Method: | nut | Good | Good | NG | NG | NG |
|  | washer | NG | NG | NG | NG | NG |

In parenthesis, A represents Type A and D represents Shore D.

It must be noted here that the present invention is not limited to the embodiments as described above. The foregoing embodiments are mere examples; any form having substantially the same composition as the technical concept described in claims of the present invention and showing similar effects is included in the technical scope of the present invention.

What is claimed is:

1. A curable organopolysiloxane composition containing:
   (A) a compound shown by the following average composition formula (1),

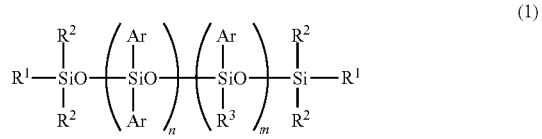

(1)

wherein $R^1$ represents the same or different aliphatic unsaturated groups; $R^2$ represents the same or different unsubstituted or substituted monovalent hydrocarbon groups; $R^3$ represents the same or different unsubstituted or substituted aliphatic hydrocarbon groups; Ar represents the same or different unsubstituted or substituted aryl groups which may contain a heteroatom; and "n" and "m" represent positive numbers which satisfy n≥1, m≥1, and n+m≥10, (B) a hydrogen atom-containing organic silicon compound having at least two silicon atom-bonded hydrogen atoms per one molecule while not having an aliphatic unsaturated group, and
   (C) a hydrosilylatation catalyst which contains a platinum group metal,
wherein the compound shown by the formula (1) of the component (A) is synthesized via a cyclic oligomer shown by the following average composition formula (2),

(2)

wherein $R^3$ and Ar represent the same meanings as before; and n' and m' represent positive numbers which satisfy n'≥1 and m'≥1, and wherein the curable organopolysiloxane composition further contains the cyclic oligomer shown by the formula (2).

2. The curable organopolysiloxane composition according to claim 1, wherein Ar in the formula (1) and formula (2) is a phenyl group.

3. The curable organopolysiloxane composition according to claim 1, wherein the component (B) is an organohydrogen polysiloxane shown by the following average composition formula (3),

(3)

wherein $R^5$ represents the same or different unsubstituted or substituted silicon atom-bonded monovalent hydrocarbon groups other than an aliphatic unsaturated group; and "b" and "c" represent positive numbers which satisfy 0.7≤b≤2.1, 0.001≤c≤1.0, and 0.8≤b+c≤3.0.

4. The curable organopolysiloxane composition according to claim 2, wherein the component (B) is an organohydrogen polysiloxane shown by the following average composition formula (3),

(3)

wherein $R^5$ represents the same or different unsubstituted or substituted silicon atom-bonded monovalent hydrocarbon groups other than an aliphatic unsaturated group; and "b" and "c" represent positive numbers which satisfy 0.7≤b≤2.1, 0.001≤c≤1.0, and 0.8≤b+c≤3.0.

5. The curable organopolysiloxane composition according to claim 1, wherein the curable organopolysiloxane composition contains further, as the component (D), an organic silicon compound shown by the following average composition formula (4) and having at least one $R^4SiO_{3/2}$ unit per one molecule,

(4)

wherein $R^4$ represents the same or different unsubstituted or substituted monovalent hydrocarbon groups, wherein at least one of $R^4$ is an aryl group, and 0.1 to 40 mole % of entirety of $R^4$ is an aliphatic unsaturated group; and "a" represents a positive number which satisfies 1≤a<3.

6. The curable organopolysiloxane composition according to claim 2, wherein the curable organopolysiloxane composition contains further, as the component (D), an organic silicon compound shown by the following average composition formula (4) and having at least one $R^4SiO_{3/2}$ unit per one molecule,

(4)

wherein $R^4$ represents the same or different unsubstituted or substituted monovalent hydrocarbon groups, wherein at least one of $R^4$ is an aryl group, and 0.1 to 40 mole % of entirety of $R^4$ is an aliphatic unsaturated group; and "a" represents a positive number which satisfies $1 \leq a < 3$.

7. The curable organopolysiloxane composition according to claim 3, wherein the curable organopolysiloxane composition contains further, as the component (D), an organic silicon compound shown by the following average composition formula (4) and having at least one $R^4SiO_{3/2}$ unit per one molecule,

$$R^4_aSiO_{(4-a)/2} \qquad (4)$$

wherein $R^4$ represents the same or different unsubstituted or substituted monovalent hydrocarbon groups, wherein at least one of $R^4$ is an aryl group, and 0.1 to 40 mole % of entirety of $R^4$ is an aliphatic unsaturated group; and "a" represents a positive number which satisfies $1 \leq a < 3$.

8. The curable organopolysiloxane composition according to claim 4, wherein the curable organopolysiloxane composition contains further, as the component (D), an organic silicon compound shown by the following average composition formula (4) and having at least one $R^4SiO_{3/2}$ unit per one molecule,

$$R^4_aSiO_{(4-a)/2} \qquad (4)$$

wherein $R^4$ represents the same or different unsubstituted or substituted monovalent hydrocarbon groups, wherein at least one of $R^4$ is an aryl group, and 0.1 to 40 mole % of entirety of $R^4$ is an aliphatic unsaturated group; and "a" represents a positive number which satisfies $1 \leq a < 3$.

9. The curable organopolysiloxane composition according to claim 8, wherein the curable organopolysiloxane composition is capable of giving a cured product having refractive index of 1.54 or higher.

10. An optical device sealing material comprising the curable organopolysiloxane composition according to claim 9.

11. An optical device which is sealed by the cured product of the optical device sealing material according to claim 10.

* * * * *